(12) United States Patent
Wood

(10) Patent No.: US 9,512,817 B2
(45) Date of Patent: Dec. 6, 2016

(54) DIFFUSER AUGMENTED WIND TURBINES

(75) Inventor: Ben David Wood, Oxford (GB)

(73) Assignee: Anakata Wind Power Resources s.a.r.l., Corcelles (CH)

( * ) Notice: Subject to any disclaimer, the term of this patent is extended or adjusted under 35 U.S.C. 154(b) by 560 days.

(21) Appl. No.: 14/010,000

(22) PCT Filed: Apr. 5, 2012

(86) PCT No.: PCT/GB2012/050771
§ 371 (c)(1),
(2), (4) Date: Nov. 14, 2013

(87) PCT Pub. No.: WO2012/137008
PCT Pub. Date: Oct. 11, 2012

(65) Prior Publication Data
US 2014/0227092 A1 Aug. 14, 2014

(30) Foreign Application Priority Data
Apr. 5, 2011 (GB) .................. 1105779.1

(51) Int. Cl.
*F03D 1/04* (2006.01)
*F03D 1/02* (2006.01)

(52) U.S. Cl.
CPC ................ *F03D 1/04* (2013.01); *F03D 1/025* (2013.01); *F05B 2210/30* (2013.01);
(Continued)

(58) Field of Classification Search
CPC ........ F03D 1/025; F03D 1/04; F05B 2210/30; F05B 2240/122; F05B 2240/124; F05B 2240/133; F05B 2240/311; F05B 2240/32; F05B 2240/40; F05B 2240/91; F05B 2240/92; F05B 2240/93; F05B 2240/95; F05B 2280/5001; Y02E 10/721; Y02E 10/728
See application file for complete search history.

(56) References Cited

U.S. PATENT DOCUMENTS 2,563,279 A * 8/1951 Rushing .................. F03D 1/025
290/55
4,021,135 A * 5/1977 Pedersen .................. F03D 1/04
290/55
(Continued)

FOREIGN PATENT DOCUMENTS

CN 101865074 A 10/2010
DE 10200601934 A1 10/2007
(Continued)

OTHER PUBLICATIONS

UK Examination Report for corresponding Application No. GB1105779.1 mailed Aug. 30, 2013, 3 pages.
(Continued)

*Primary Examiner* — Igor Kershteyn
(74) *Attorney, Agent, or Firm* — Merchant & Gould P.C.

(57) ABSTRACT

An example wind turbine diffuser has an expanded outlet area where the diffuser outlet area is greater than it's cross sectional area. The diffuser may be formed of one or more diffuser rings, at least one of which may form a turbine cowling. Each diffuser ring may have an inlet area that is smaller than the outlet area of the directly upstream ring. The portion of an upstream ring outlet which is not occluded by the downstream ring may form a diffuser outlet such that the total outlet area of the diffuser is larger than the cross-sectional area. In another example, the diffuser may comprise at least one diffuser ring and one or more suction slots that are each connected to a vent, which allows air to be removed from the diffuser system.

29 Claims, 10 Drawing Sheets

(52) U.S. Cl.
CPC ... *F05B 2240/122* (2013.01); *F05B 2240/124* (2013.01); *F05B 2240/133* (2013.01); *F05B 2240/311* (2013.01); *F05B 2240/32* (2013.01); *F05B 2240/40* (2013.01); *F05B 2240/91* (2013.01); *F05B 2240/92* (2013.01); *F05B 2240/93* (2013.01); *F05B 2240/95* (2013.01); *F05B 2280/5001* (2013.01); *Y02E 10/721* (2013.01); *Y02E 10/728* (2013.01)

(56) References Cited

U.S. PATENT DOCUMENTS

| | | | |
|---|---|---|---|
| 4,075,500 A | | 2/1978 | Oman et al. |
| 4,256,435 A | * | 3/1981 | Eckel .................... F03D 1/0658 415/209.1 |
| 4,720,640 A | | 1/1988 | Anderson et al. |
| 4,781,522 A | * | 11/1988 | Wolfram ................ F03D 1/025 415/1 |
| 6,952,058 B2 | * | 10/2005 | McCoin ................. F03D 1/025 290/44 |
| 7,214,029 B2 | * | 5/2007 | Richter .................. F03D 1/025 415/193 |
| 7,220,096 B2 | * | 5/2007 | Tocher .................... F03D 1/04 290/55 |
| 7,758,300 B2 | * | 7/2010 | Friesth .................... F03D 1/025 415/144 |
| 7,874,788 B2 | * | 1/2011 | Stothers .................. F03B 3/04 415/148 |
| 7,976,268 B2 | * | 7/2011 | Presz, Jr. ................. F03D 1/04 415/211.2 |
| 2005/0002783 A1 | | 1/2005 | Hiel et al. |
| 2010/0181775 A1 | | 7/2010 | Yu |

FOREIGN PATENT DOCUMENTS

| | | |
|---|---|---|
| DE | 102006019345 A1 | 10/2007 |
| DE | 202007010872 U1 | 11/2007 |
| EP | 2213872 A1 | 4/2010 |
| FR | 2491557 A1 | 4/1982 |
| GB | 1508752 A | 4/1978 |
| JP | 3071880 U | 9/2000 |
| JP | 2001193634 A | 7/2001 |
| JP | 4371259 B2 | 11/2009 |
| WO | 2008/043367 A1 | 4/2008 |
| WO | 2009/063599 A1 | 5/2009 |
| WO | 2009076479 A2 | 6/2009 |
| WO | 2010/005289 A2 | 1/2010 |
| WO | 2010/036678 A1 | 4/2010 |

OTHER PUBLICATIONS

UK Examination Report for corresponding application No. GB1105779.1 mailed Sep. 3, 2013, 3 pages.
International Search Report for International Application No. PCT/GB2012/050771 mailed Jun. 29, 2012.
Communication Regarding Non-English Reference DE 20 2007 010 872 U2.

* cited by examiner

DIFFUSER AUGMENTED WIND TURBINES

This application is a National Stage Application of PCT/GB2012/050771, filed 5 Apr. 2012, which claims benefit of Serial No. 1105779.1, filed 5 Apr. 2011 in Great Britain and which applications are incorporated herein by reference. To the extent appropriate, a claim of priority is made to each of the above disclosed applications.

TECHNICAL FIELD

This description relates to wind turbines that are augmented with diffusers or ducting arrangements that accelerate airflow to the rotor plane.

BACKGROUND

The listing or discussion of an apparently prior-published document in this specification should not necessarily be taken as an acknowledgement that the document is part of the state of the art or is common general knowledge.

A wind turbine is a device that can be used to convert kinetic energy (from the wind) into mechanical energy, for example by using wind to rotate turbine rotor blades. An example of a classic wind turbine is a horizontal axis wind turbine comprising an electrical generator in a horizontal central hub with turbine rotor blades attached. The turbine rotor delivers torque energy to the generator hub which converts this to electrical energy via an electrical generator. However, a classical wind turbine that is not augmented with a diffuser is limited in the amount of energy it can convert from wind by Betz' law, which states that for a classical wind turbine, in which the airflow is axial and free streaming, no more than 59.3% of kinetic energy from wind can be converted to mechanical energy.

Wind turbine diffusers may be used to increase the velocity of the air entering the turbine's rotor plane, thus increasing the power output and efficiency of any given turbine. Conventional diffusers require a large expansion in exit area of the wind turbine in order to induce a relatively modest increase in wind speed (and hence, power output and efficiency). This increased exit area reduces the air pressure behind the turbine and leads to air being accelerated over the turbine rotor blades. However, expanding the exit area of the wind turbine generally results in the use of large, uneconomic and highly drag-loaded cowlings around the turbine. US 2005/0002783 A1 describes a diffuser augmented wind-turbine which has an expanded exit area.

Another example of a conventional wind turbine diffuser is one that uses a mixer-ejector system to draw high energy air into the rear section of the diffuser. In theory, this system decreases the air pressure behind the wind turbine and therefore draws more air through the turbine rotor plane, which increases the power output and efficiency. However, injection-mixer systems may not provide as significant an increase in the velocity of the air passing through the turbine in practice and therefore may not provide a significant increase in power output efficiency. WO 2010/036678 A1 describes a mixer-ejector (MEWT) wind turbine.

SUMMARY

Diffuser augmented wind turbines are described below. In an embodiment a wind turbine comprises a turbine rotor, the turbine rotor having one or more turbine blades and a diffuser. The diffuser has an expanded outlet area where the diffuser outlet area is greater than it's cross sectional area, proviso, none of the elements of the diffuser are rotatable about the horizontal axis. In an example, the diffuser may be formed of one or more diffuser rings, at least one of which may form a turbine cowling. Each diffuser ring may have an inlet area that is smaller than the outlet area of the directly upstream ring. In an example the portion of an upstream ring outlet which is not occluded by the downstream ring may form a diffuser outlet such that the total outlet area of the diffuser is larger than the cross-sectional area. In another example, the diffuser may comprise at least one diffuser ring and one or more suction slots that are each connected to a vent, which allows air to be removed from the diffuser system.

One aspect of the invention relates to a diffuser which is static about the horizontal axis, but rotatable about the vertical axis. The diffuser comprises a first diffuser ring having an inlet and an outlet, where the outlet area is equal to or greater than the inlet area, one or more further diffuser rings co-axial to and downstream from the first diffuser ring, the one or more further diffuser rings each having an inlet and an outlet where the inlet area of each of the one or more diffuser rings is less than the outlet area of the immediately upstream diffuser ring and the outlet area of each of the one or more diffuser rings is greater than or equal to its inlet area, wherein the total outlet area of the diffuser is greater than its largest cross-sectional area, provided that the first diffuser ring and all of the one or more diffuser rings are not rotatable around the horizontal axis.

In an embodiment, the diffuser further comprises one or more vent structures and one or more suction slots, where the one or more vent structures are located on the exterior surface of the first diffuser ring and the or each vent structure is connected to a suction slot, the suction slot extending substantially radially through the entire thickness of the first diffuser ring.

In another aspect of the invention, the diffuser (e.g. for use in a wind turbine) may comprise a first diffuser ring having an inlet and an outlet, where the outlet area is equal to or greater than the inlet area, one or more vent structures and one or more suction slots, where the one or more vent structures are located on the exterior surface of the first diffuser ring and the one or more vent structures are each connected to a suction slot, the suction slot extending substantially radially through the entire thickness of the first diffuser ring and wherein the total outlet area of the diffuser is greater than its largest cross-sectional area, provided that the first diffuser ring is not rotatable around the horizontal axis.

In a further embodiment the diffuser may have one or more further diffuser rings co-axial to and downstream of the first diffuser ring, the one or more further diffuser rings each having an inlet and an outlet, where the inlet area of each of the one or more diffuser rings is less than the outlet area of the immediately upstream diffuser ring and the outlet area of each of the one or more diffuser rings is greater than or equal to its inlet area, provided that all of the one or more further diffuser rings are not rotatable around the horizontal axis.

According to an aspect of the invention, the wind turbine is a horizontal axis wind turbine augmented with a diffuser, the diffuser comprising a first diffuser ring arranged to form a turbine rotor cowling, the diffuser ring having an inlet and an outlet, where the outlet area is equal to or greater than the inlet area, one or more further diffuser rings co-axial to and downstream from the first diffuser ring, the one or more further diffuser rings each having an inlet and an outlet where the inlet area of each of the one or more further diffuser rings is less than the outlet area of the immediately upstream diffuser ring and the outlet area of each of the one or more diffuser rings is greater than or equal to its inlet area, wherein the total outlet area of the diffuser is greater than its largest cross-sectional area, provided that the first diffuser ring and all of the one or more further diffuser rings are not rotatable around the horizontal axis.

In a further embodiment the wind turbine further comprises one or more vent structures and one or more suction slots, where the one or more vent structures are located on the exterior surface of the first diffuser ring and one or more vent structures are connected to one or more suction slots, the one or more suction slots extending substantially radially through the entire thickness of the first diffuser ring.

According to another aspect of the invention, the wind turbine is a horizontal axis wind turbine augmented with a diffuser, the diffuser comprising a first diffuser ring arranged to form a turbine cowling, the diffuser ring having an inlet and an outlet, where the outlet area is equal to or greater than the inlet area, one or more vent structures and one or more suction slots, where the one or more vent structures are located on the exterior surface of the first diffuser ring and the one or more vent structures connected to one or more suction slots, the suction slot extending substantially radially through the entire thickness of the first diffuser ring and wherein the total outlet area of the diffuser is greater than its largest cross-sectional area, provided that the first diffuser ring is not rotatable around the horizontal axis.

According to another aspect of the invention, the wind turbine is a horizontal axis wind turbine augmented with a diffuser comprising a first diffuser ring arranged to form a turbine rotor cowling, the diffuser ring having an inlet and an outlet, where the outlet area is equal to or greater than the inlet area provided that the first diffuser ring is not rotatable around the horizontal axis and one or more vortex entrainment devices arranged on a trailing edge of the outlet of the diffuser ring.

In a further embodiment the wind turbine may have one or more further diffuser rings co-axial to and downstream of the first diffuser ring, the one or more further diffuser rings each having an inlet and an outlet where the inlet area of each of the one or more further diffuser rings is less than the outlet area of the immediately upstream diffuser ring and the outlet area of each of the one or more diffuser rings is greater than or equal to its inlet area, provided that all of the one or more further diffuser rings are not rotatable around the horizontal axis.

In a further embodiment the diffuser may further comprise one or more vent structures and one or more suction slots, where the one or more vent structures are located on the exterior surface of the first diffuser ring and the or each vent structure is connected to one or more suction slots, the suction slots extending substantially radially through the entire thickness of the first diffuser ring.

The ratio of the total diffuser outlet area to the first diffuser ring inlet area may be greater than the ratio of the largest diffuser cross-sectional area to the first diffuser ring inlet area.

The vent structures may be hollow channel structures shaped to have an aerofoil profile in cross-section.

The wind turbine may comprise a central shaft and radially oriented guide vanes arranged so that a first end is connected to a first part of the diffuser and a second end is connected to a second part of the diffuser, the guide vanes being arranged to provide structural support to the diffuser. The guide vanes may be arranged to reduce twist in airflow passing through the diffuser and are comprised of at least one of; pre-rotation vanes, located upstream of the turbine plane and/or post-rotation vanes, located downstream of the turbine plane.

The wind turbine may comprise one or more turbine blades to form a first turbine rotor. The diffuser may be at least partially constructed from an aero-elastic material and arranged to provide a controlled deformation under wind load. The diffuser may further incorporate a vortex generator. The one or more turbine blades forming the first turbine rotor may be at least partially constructed from an aero-elastic material and arranged to provide a controlled deformation under wind load.

In a downstream direction, each of the one or more further diffuser rings may have a lower camber than the immediately previous diffuser ring.

The wind turbine may further comprise one or more slot gaps which extend from the interior surface through at least a partial thickness of the first diffuser ring, and optionally, the one more slot gaps may extend through the entire thickness of the first diffuser ring. The one or more slot gaps and/or the one or more suction slots may be located on a region of the interior of the first diffuser ring that is highly cambered. The first diffuser ring may further incorporate a plenum chamber that is connected to one or more of the slot gaps and/or one or more of the suction slots and air may optionally be actively pumped into or sucked out of the plenum chamber.

The turbine blade may be constructed of material which induces turbulence in the boundary layer of the airflow. The turbine blade may have at least one attached turbulator and/or at least one attached vortex generator. The turbine blade may have a partially scalloped structure.

The turbine rotor may located downstream of the principle vertical axis of the turbine. The wind turbine may further comprise one or more additional turbine rotors each comprising one or more turbine rotor blades mounted co-axial to and downstream from the first turbine rotor. The one or more additional turbine rotors may be a counter-rotating turbine rotor. The one or more turbine blades of the one or more additional turbine rotors may optionally be at least partially constructed from an aero-elastic material and optionally arranged to provide a controlled deformation under wind load.

One or more further dynamic, aero-elastic, vortex entrainment devices may be attached to a further trailing edge of the diffuser. A diffuser augmented wind-turbine as described above may comprise one or more generators, the one or more generators comprising at least one generator stator and at least one generator rotor being fixed to, or incorporated within a diffuser ring and the other of the stator or rotor being fixed to or incorporated within the tip of at least one turbine blade in the one or more turbine rotors. The wind turbine may be a land based turbine, a sea based turbine or an airborne turbine.

According to one aspect of the invention the wind turbine is substantially as described herein with reference to, and as shown in, the accompanying drawings.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
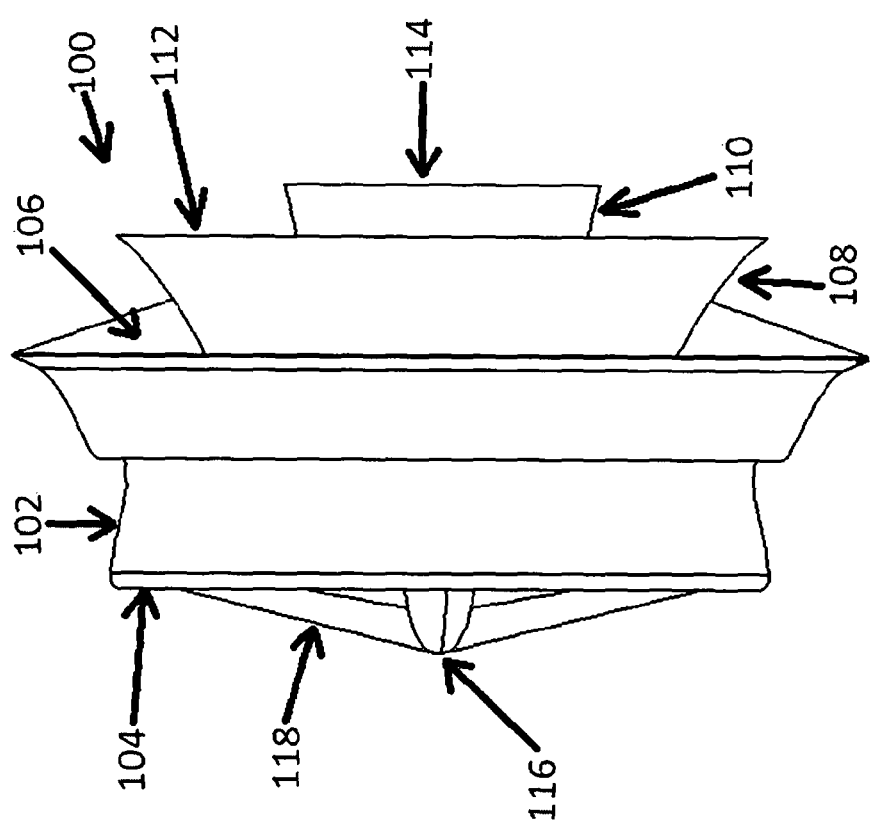
FIG. 1 is a side view of a diffuser embodiment with multiple diffuser rings.

Conventional horizontal axis wind turbines are used in wind farms for commercial production of electric power. They are typically comprised of a three-bladed turbine rotor connected to an electrical generator that is located in the turbine shaft.

When wind flows over the blades of a wind turbine rotor, lift is generated by the blades and causes the turbine rotor to turn, leading to the generation of electricity from the attached electrical generator (e.g. comprising a low speed drive shaft, a gearbox and a generator shaft). Therefore, as the turbine rotor turns, it rotates the low speed drive shaft attached to the gearbox, which in turn rotates the generator shaft at a speed required to generate electricity.

The lift created by a turbine rotor blade may be a function of its angle of attack and shape.

A yaw system is used to move the turbine rotor and ensure that it is pointed into the wind, in order to achieve the highest efficiency possible, according to Betz' law. The pointing may be carried out passively (e.g. using a wind vane) or actively (e.g. using computer-controlled yaw control system).

A diffuser may be fitted to a wind turbine in order to augment airflow into and around a horizontal axis wind turbine. The efficiency of the system may exceed theoretical Betz limits by hyper-accelerating air through a turbine rotor plane. This may be achieved by extracting the air through a compact diffusive system by using a large outlet area. By increasing the outlet area of a diffuser, one decreases the air pressure at the outlet, thereby causing air to be accelerated through the turbine. Therefore, decreasing the air pressure at the outlet will result in a corresponding increase in air velocity at the inlet, which leads to increased power output and efficiency.

A major practical issue for conventional diffuser-augmented wind turbines is that the large expansion in outlet area needed to accelerate air to a velocity that will give a large increase in efficiency has previously required a bulky and unwieldy cowling that creates a large aerodynamic load. The use of such a cowling may increase the amount of drag generated and increase the load on the wind turbine support tower. The production cost and space required for the turbine will also be significantly increased. The visibility profile of the diffuser may also be increased, which is undesirable as wind turbines are considered by many people to be unsightly.

When used herein the term "diffuser ring" relates to any suitable configuration, such as an elliptical or, particularly, circular shape in cross section. Where two or more diffuser rings are described in combination, the rings are in fluid connection with each other and may be co-axial or off-axis.

The term "clearance region" when used herein relates to a region within the diffuser between a diffuser ring and a turbine rotor blade which is not swept by the turbine rotor blade.

When used herein, aerodynamic force relates to the force generated when air flows over the turbine rotor blade. The term "lift" is used herein to refer to a component of the aerodynamic force which is perpendicular to the direction of the airflow. The term "drag" is used herein to refer to the component of the aerodynamic force which is parallel to the airflow.

The term "yaw" is used herein to refer to the movement of the wind turbine rotor around the vertical axis of the turbine.

The term "nacelle" is used herein to refer to the covering of the central shaft of the turbine which is rotatable about the horizontal axis and may house the generator and/or the gearbox.

The terms "upstream" and "downstream" are used herein to indicate direction relative to airflow.

The term "camber" is used herein to refer to aerodynamic camber e.g. a measure of the curvature of an aerofoil. Camber can be measured using, for example, a camber line, which is the curve that is halfway between the upper and lower surfaces of the aerofoil.

The term "aero-elastic material" is used herein to refer to a material that produces a controlled and predictable deformation under wind load. A non-exhaustive list of examples of aero-elastic materials that may be used are carbon fibre, fibre reinforced composites, metal matrix composites, epoxy based composites, thermoplastic composite, aluminium, fabric, piezoelectric materials or other appropriate aero-elastic materials and any combination thereof.

The term "stall" is used herein to refer to a reduction in the lift produced by the turbine rotor blade as the angle of attack increases (the angle of attack is an the angle between a reference line on a turbine rotor blade (e.g the chord line) and the vector representing the relative motion between the turbine rotor blade and the air moving through the turbine rotor plane). Beyond a critical angle of attack less lift than drag is created.

The term "pitch" is used herein to refer to turning the angle of attack of the turbine rotor blades into or out of the wind to control the production or absorption of power.

The term "substantially radially" is used herein to refer to a diffuser or wind turbine component which extends outwards from a central point of the diffuser. However, the component of the diffuser is not required to be linear in profile.

Although the present examples are described and illustrated herein as being implemented in a diffuser augmented wind turbine, the systems described are provided as an example and not a limitation. As those skilled in the art will appreciate, the present examples are suitable for application in a variety of different types of ducted rotors.

In an embodiment of the invention, the diffuser is static about the horizontal axis (e.g. non-rotatable about the horizontal axis) and comprises a first (primary) diffuser ring that is arranged to form a cowling surrounding a turbine rotor, the turbine rotor comprising one or more turbine blades. The turbine cowling and the turbine rotor are arranged in combination so that there is a clearance region between the one or more turbine rotor blades and the turbine cowling. In an embodiment the internal diameter of the turbine cowling is greater than the swept diameter of the turbine blades, such as 2.5-10% greater e.g. 5% greater. In an embodiment the diffuser may be attached to the wind turbine superstructure via a yaw bearing so that the diffuser structure is able to yaw 360° in accordance with the wind direction.

In a diffuser with multiple diffuser rings, the first diffuser ring has an inlet and an outlet, the outlet area being equal to or greater than the inlet area (e.g. the outlet area is preferably greater than the inlet area). The diffuser may also have one or more further diffuser rings that are co-axial to, and downstream from, the first diffuser ring. The one or more further diffuser rings also have an inlet and an outlet, where the inlet area of each downstream diffuser ring is less than the outlet area of the immediately upstream diffuser ring and the outlet area of each respective diffuser ring is greater than or equal to the inlet area of that diffuser ring. For example, the outlet area of each diffuser ring may be greater than its inlet area. At least a portion of the diffuser may be arranged to form a turbine rotor cowling (e.g. the first diffuser ring may be arranged to form a turbine rotor cowling). The cross-sectional profile of each of the diffuser rings described herein may be conical or cylindrical (e.g. conical), amongst other profiles.

Air is able to escape from the diffuser through the portion of each diffuser ring that is un-occluded by any immediately downstream diffuser ring. The outlet of the diffuser is therefore formed by the portion of each diffuser ring that is un-occluded by an inlet area of any immediately downstream diffuser ring (i.e. the area from which the air can escape the diffuser system). In an embodiment the total outlet area of the diffuser is greater than its largest cross-sectional area.

In one aspect the diffuser may comprise a first diffuser ring and any appropriate number of further diffuser rings may be used (e.g. from one to four further diffuser rings, such as two or three further diffuser rings (e.g. one or two further diffuser rings).

In another aspect the diffuser may comprise a first diffuser ring and one or more vent structures and one or more suction slots. The one or more vent structures may be located on the exterior surface of the first diffuser ring and each of the vent structures may be connected to a suction slot. The diffuser may optionally comprise a number of further diffuser rings (e.g. from one to four further diffuser rings such as two or three further diffuser rings (e.g. one or two further diffuser rings).

Diffuser configurations as described in some embodiments of the current application have a large expansion of the outlet area without a significant increase in cross-sectional area. This allows air to be accelerated through the turbine, giving an increase in efficiency while overcoming the issues related to a large increase in size of the turbine. The expansion in outlet area may be in the range of 1.2-10 times the area of the inlet area, such as 2:1 to 5:1 (e.g. 2.5:1 to 4.5:1) times the inlet area.

The ratio of the total diffuser outlet area to the first diffuser ring inlet area is greater than the ratio of the largest diffuser cross-sectional area to the first diffuser ring inlet area. Examples of an appropriate ratio of total diffuser ring outlet area to the first diffuser ring inlet area may be 2:1, 2.5:1, 3.2:1, 4:1, 4.5:1, 3.2:1 (e.g. 2.1:1, 3.2:1, such as 3.2:1).

In another aspect the diffuser may comprise a first diffuser ring with one or more vortex entrainment devices arranged on a trailing edge of the outlet of the diffuser ring. The vortex entrainment devices may optionally be integrally formed with the first diffuser ring.

The diffuser may have any configuration that will reduce the drag associated with the structure, such as, but not limited to, a cylindrical, ovoid or a conical configuration (e.g. a conical configuration).

The diffuser rings may be constructed so that each diffuser ring, in a downstream direction, has a lower aero-dynamic camber than the preceding ring. In an embodiment, each of the diffuser rings has a lower camber than the previous diffuser rings in a downstream direction. Without wishing to be bound by theory, it is believed that this results in the creation of geometrically increasing diffuser ducts, leading to a progressively lower exit pressure. The diffuser may further comprise a plurality of radially oriented guide vanes arranged so that a first end is connected to a first part of the diffuser and a second end is connected to a second part of the diffuser. In an example, the guide vanes may be aerofoil shaped, however, this is not essential and any appropriate shape may be used. The guide vanes may be arranged to provide additional structural support to the diffuser. The additional structural support may facilitate aero-elastic deformation of the diffuser, for example due to different wind loads.

The diffuser may be at least partially constructed of an aero-elastic material. In an example the diffuser may be comprised of one or more aero-elastic flaps. The deformation of the diffuser may enable airflow stall to be prevented (for low wind speeds) or enabled (for high wind speeds), according to the prevailing wind-speed. In low wind-speed conditions (e.g. less than 20 m/s) preventing air-flow stall may comprise tuning the diffuser to decrease angle of attack. For example, the diffuser may be tuned so that airflow is directed to the tips of the wind turbine's rotor blades. Passive aero-elastic tuning of the diffuser to different aero-dynamic configurations dependent on the wind-speed may allow the wind turbine to continue to produce electricity even at low wind-speeds. In high wind speed conditions (e.g. greater than 20 m/s) inducing airflow stall may comprise, for example, tuning the diffuser so that the angle of attack is increased. Inducing airflow stall may be used to reduce airflow through the diffuser and/or reduce drag to protect the structure at high wind-speeds. Aero-elastic tuning may also be used to reduce the amount of drag produced by the turbine diffuser.

Using aero-elastic materials to construct the diffuser or the turbine rotor blades, rather than using systems that mechanically adjust the diffuser and/or the turbine rotor blades (e.g. the use of hinged systems) reduces the complexity of the wind turbine and provides increased reliability and ease of construction. For example, adjustments to wind turbine rotor blades to alter the pitch have typically been carried out using a mechanical bearing and/or a slewing drive. The slewing drive may be a hydraulic or electrical system. Breaking systems may also be used in order to adjust the turbine rotor speed or stop the rotor in dangerous wind conditions or for maintenance. These systems increase the complexity of the wind turbine and may not alter the pitch of the blade quickly enough in gusty wind conditions. Complex slewing and breaking systems are also prone to failure, which, in the event that a turbine exceeds its engineered limits in high wind conditions, may result in the generator overheating and/or cause irreparable damage to the wind turbine.

In a further embodiment, the turbine rotor blades may optionally also be at least partially constructed from an aero-elastic material and arranged to provide controlled deformation under wind load. Constructing the turbine rotor blades from aero-elastic materials allows the blades to be passively tuned according to the instantaneous wind conditions and may reduce or eliminate the need for complex mechanical systems for adjusting blade pitch and rotor speed.

Augmenting a wind turbine with a diffuser as described herein may have a number of advantages in addition to more efficient conversion of wind energy to electrical energy when compared to a classical wind turbine of equal rotor diameter. As described above, peak output may be manipulated with wind speed and rotor toque via the control of radial velocity distribution. Additional features may be incorporated into the diffuser in order to reduce wake turbulence, which allows turbines to be mounted closer to other turbines. This may provide financial benefits for onshore and particularly for offshore installations. A number of features which may be used to facilitate a reduction in wake turbulence are described herein. Furthermore, by controlling or eliminating blade tip vortices an enclosed rotor blade may reduce the amount of noise pollution produced. In some embodiments, the diffuser systems described herein may also be retrofitted into suitable existing turbine installations.

It will be understood that that the diffuser augmented wind turbines described herein are not limited to land based turbines. The diffuser augmented turbines may be located on or in water such as in an offshore wind turbine (e.g. a floating turbine). The diffuser-augmented wind turbines may also be airborne turbines e.g. tethered turbines. For example, the diffuser may additionally incorporate lifting components such as bladders, which may be filled with a lighter than air substance (e.g. helium) in order to elevate the turbine.

FIG. 1 is a cross-sectional view of a diffuser with multiple diffuser rings as described above. In this embodiment, a wind turbine may be augmented with diffuser 100. The diffuser 100 comprises a first (primary) diffuser ring 102 that has an inlet 104 and an outlet 106, the outlet area being greater than the inlet area in this figure. The diffuser of FIG. 1 also has two further diffuser rings 108, 110 which are co-axial to and downstream from the first diffuser ring 102. Each of diffuser rings 108 and 110 also have an inlet (hidden in FIG. 1) and an outlet, which are shown as 112 and 114, respectively. As implied in the figure, the inlet area of the downstream diffuser rings 108 and 110 is less than the outlet area of the immediately upstream diffuser ring (e.g. the inlet of diffuser ring 108 is less than the outlet 106 or diffuser ring 102) and the outlet area of diffuser rings 108 and 110 (112 and 114, respectively) is greater than the inlet area of that diffuser ring.

As shown in FIG. 1, the diffuser may optionally further comprise a central shaft 116. Central shaft 116 may be an integral aspect of the diffuser or a part of the wind turbine superstructure and may have a structural support function. In a diffuser augmented wind turbine, the central shaft 116 may form a nacelle which houses a generator and gearing which can be used to convert the mechanical energy of the turbine into electrical energy. As shown in FIG. 1, central shaft 116 may have an aerodynamic design. Optionally, the central shaft 116 may be rotatable and connected to the wind turbine tower via a rotatable bearing.

As shown in FIG. 1, the diffuser-augmented wind turbine may optionally further comprise guide vanes, such as pre-rotation vanes 118. Pre-rotation vanes 118 are located upstream of the turbine plane and are arranged to reduce twist in airflow passing through the diffuser. By reducing the twist in the airflow before it reaches the diffuser, an increase in the efficiency of converting the kinetic energy of the wind into mechanical energy of the rotor can be achieved.

Figure 2:
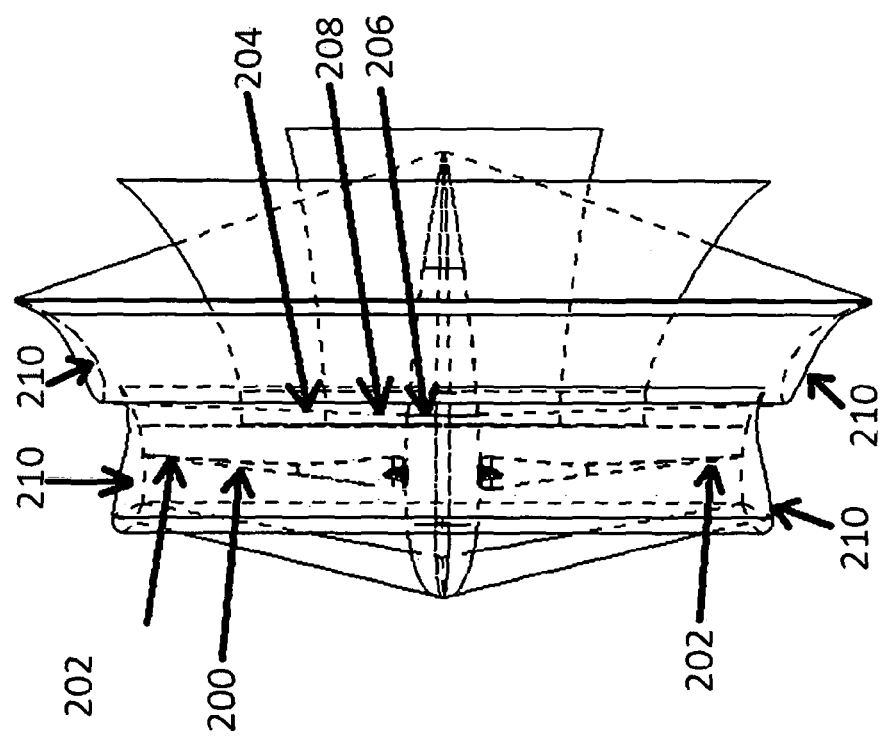
FIG. 2 is a side view of a diffuser augmented wind turbine with interior structures shown in dashed lines.

FIG. 2 is a side view of a diffuser augmented wind turbine with interior structures shown in dashed lines. In the embodiment of FIG. 2 (as in all figures described herein), the diffuser 100 forms a turbine rotor cowling where none of the diffuser elements are rotatable about the horizontal axis.

The turbine rotor 200 comprises one or more turbine rotor blades 202 (such as 1-4 turbine rotor blades, (e.g. 3 turbine rotor blades)). The wind turbine rotor blades 202 may be adjusted according to wind conditions in order to increase or decrease angle of attack. The outlet 204 of the primary diffuser ring is shown in dashed lines in FIG. 2. The inlet of the primary diffuser ring 204 is located in front (upstream) of the plane of the turbine rotor and the outlet 204 is located behind (downstream) of the turbine rotor. As shown in FIG. 2, the inlet of each of the further diffuser rings 206, 208 is located behind the turbine plane, however this is not essential and the inlet may be ahead of the turbine plane. The inlets 206, 208 of each of the further diffuser rings are shown as co-planar in FIG. 2, however this is not essential. In other examples the inlets 206, 208 of the further diffuser rings may not be co-planar. The diffuser may optionally incorporate one or more slot gaps 210, which are discussed in more detail with reference to FIG. 3 below.

When air flows over the turbine rotor blade(s) there is a boundary layer of air. The boundary layer is an area of transition between near stationary air close to the surface of the turbine rotor blade(s) and air at some distance away which is moving at the free stream velocity. The maximum thickness of the boundary layer is normally defined by the distance from the turbine rotor blade at which the air flow velocity is 99% of the free-stream velocity. Depending on the profile of the turbine rotor blade, the air will often flow smoothly in a thin boundary layer across much of the surface.

The exact nature of the boundary layer is dependent on many factors including the turbine rotor blade construction and the airflow and airspeed. However boundary layers may be either laminar (layered) or turbulent (disordered). As well as the development of airfoil stall, the details of the flow within the boundary layer are very important for many problems in aerodynamics, including the skin friction drag of an object and heat transfer. Although the skilled person will be familiar with the concepts of boundary layer physics, more details may be found in e.g. Landau & Lifshitz, 1987, Fluid Mechanics, $2^{nd}$ edn, Chapter 4, A Butterworth-Heinemann Title.

A boundary layer will tend to separate from the surface of the turbine rotor blade in a process of flow separation. Flow separation occurs when the speed of the boundary layer relative to the turbine rotor blade falls almost to zero. The fluid flow of air becomes detached from the surface of the blade, and instead takes the forms of eddies and vortices. Such flow separation causes bubbles of stagnant air to form beneath the separated layer, creating additional drag. A large increase in drag causes a decrease in efficiency and may cause the rotor to stall. Bubbles of stagnant air can be reduced or even eliminated by shaping the one or more turbine rotor blades to move the separation point downstream. For example, the turbine rotor blade may incorporate one or more of the features of:

(a) being constructed of material which induces turbulence in the boundary layer of the airflow;

(b) having a partially scalloped structure;
(c) attaching a turbulator; and/or
(d) attaching a vortex generator.

These features may trip the boundary layer into turbulence, preventing stagnation. A turbulent boundary layer contains more energy, so will delay separation until a greater magnitude of negative pressure gradient is reached, effectively moving the separation point further downstream and possibly eliminating separation completely.

A turbulator may be a mechanical turbulator (for example a zig-zag strip that is attached to the turbine rotor blade) or a pneumatic turbulator (for example small holes in the turbine rotor blade surface to blow air into the boundary layer).

A vortex generator may be a small vane or bump attached to the turbine rotor blade. The vortex generator creates a vortex which draws energetic, rapidly-moving air from outside the slow-moving boundary layer into contact with the turbine rotor blade, re-energizing the boundary layer.

In an example a vortex generator is rectangular or triangular in cross-section. A vortex generator may have a thickness equivalent to a partial thickness of the boundary layer. For example the vortex generator may be 50-90% as thick as the boundary layer. The vortex generator may be positioned in such a way that it has an angle of attack with respect to the local airflow.

Figure 3:
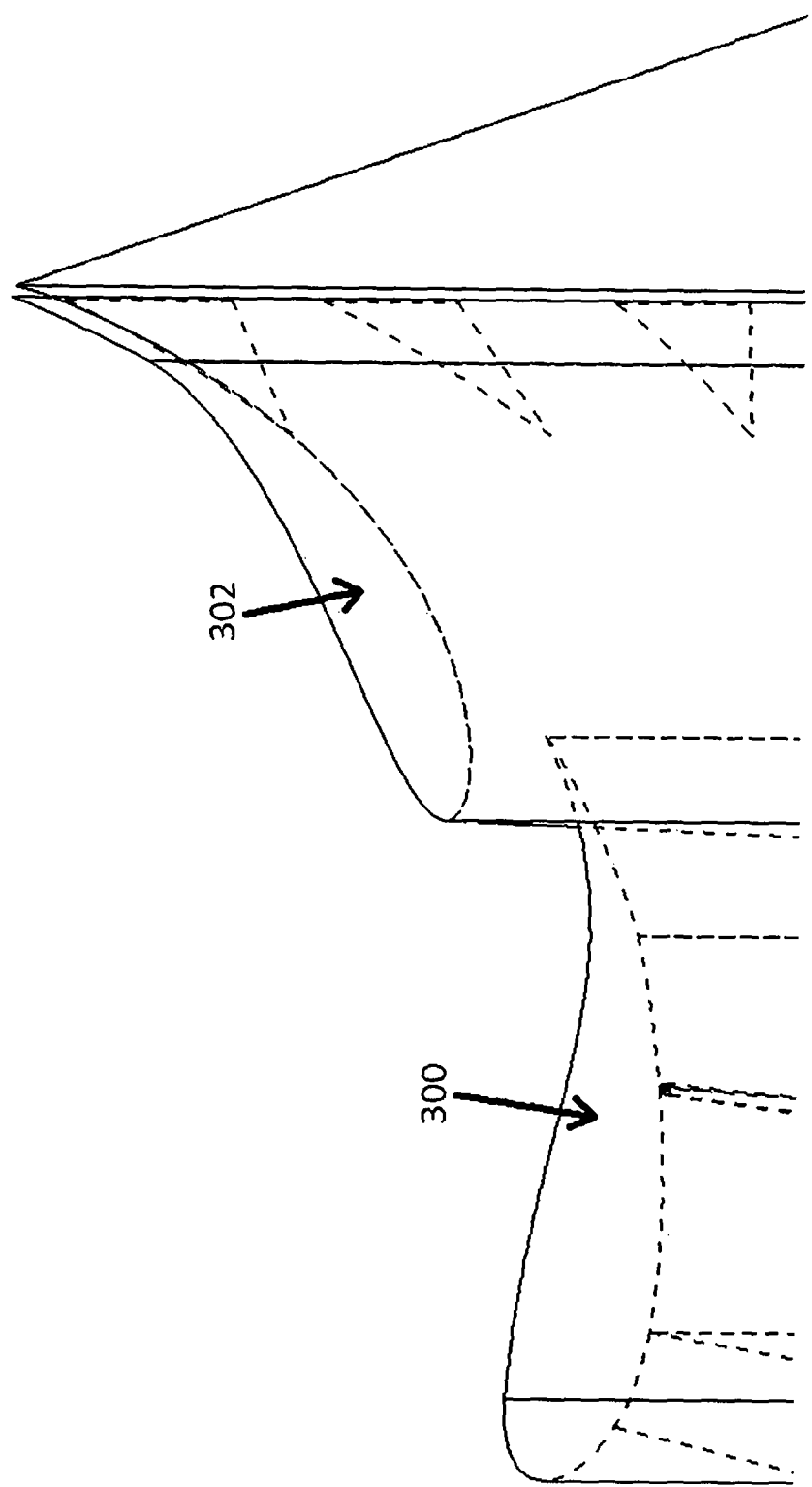
FIG. 3 is an example close-up illustration of the slot gaps in the diffuser of FIG. 2.

The diffuser may have one or more slot gaps (such as slot gaps 300 shown in FIG. 3). Air passing through a slot gap may have a total pressure close to the free-stream value e.g. the pressure of the undisturbed airflow. The one or more slot gaps enables high energy airflow to re-energise low energy airflow within the diffuser by allowing high energy airflow from the outside of the diffuser to enter the diffuser through the diffuser wall. This prevents flow separation and enables enhanced diffusion. The one or more slot gaps may be located on a region on the interior of any diffuser ring that is highly cambered. Locating the slot gap on a region of the interior of a diffuser that has a high camber may facilitate the mixing of the high energy air entering through the slot gap with the low energy air passing through the diffuser.

The slot gaps may be connected to a plenum chamber. A plenum chamber is a pressurized housing containing air at positive pressure. In an embodiment, a suction slot may be connected to the plenum chamber in order to pump air into the plenum chamber. Air may be pumped from the plenum chamber and pass through the slot gap on the internal surface of the ring and into the airflow passing through the diffuser. The fast moving pumped air may suck the slow moving boundary layer air behind it and cause the slow air to accelerate. This may increase airflow through the diffuser. The air may be pumped by an active pumping system (e.g. a compressor with an external power supply), a hydraulic system or an alternative mechanical system. In an aspect of the invention there may be one or more plenum chambers within the diffuser ring, each comprising a portion of the circumference of the ring. In another aspect of the invention there may be one plenum chamber which may extend through a large portion of the circumference of the ring. In an aspect of the invention, where one plenum chamber comprises a large portion of the circumference of the ring, the plenum chamber may additionally comprise one or more dividers or partitions arranged to provide structural support to the ring. When one or more plenum chambers are incorporated, the pumping system may optionally be switched on and off as required. In other embodiments the system may be a passive system without active pumping.

FIG. 3 is an example close-up illustration of the slot gaps in the diffuser of FIG. 2. In an embodiment, the one or more slot gaps 300 extend through the entire thickness of the first diffuser ring. In other embodiments, one or more slot gaps 302 may additionally or alternatively be located on the one or more further diffuser rings.

Figure 4:
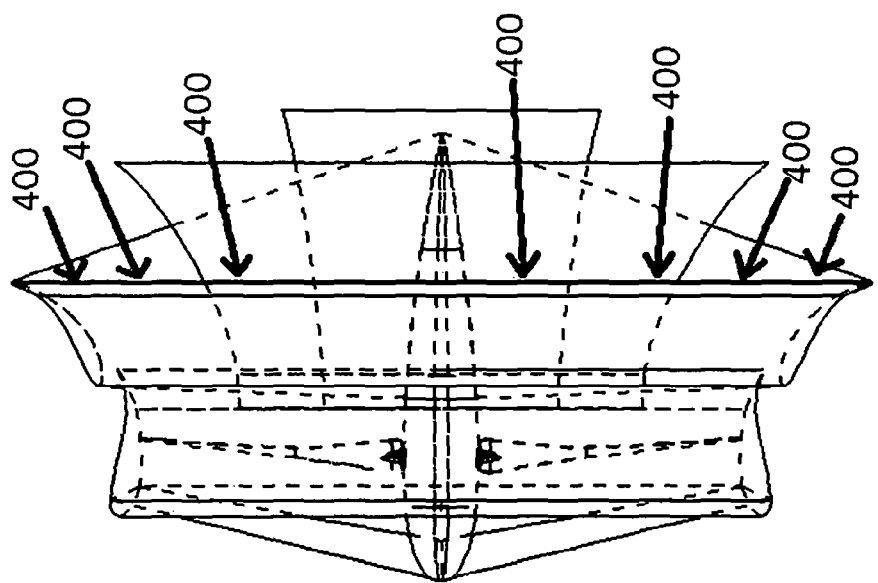
FIG. 4 illustrates a diffuser with attached vortex generators.

FIG. 4 illustrates a diffuser with attached vortex generators 400. Vortex generators 400 may be attached to the interior surface of the diffuser. As described above, vortex generators 400 may also be attached to the turbine rotor blades. As shown in FIG. 4, the vortex generators 400 may be situated close to the outlet of the primary diffuser ring 116 however, the vortex generators 400 may be located on any section of the diffuser described herein. A vortex generator attached to the diffuser performs the same function as a vortex generator attached to a turbine rotor blade, re-energising the low energy airflow within the diffuser.

Figure 5:
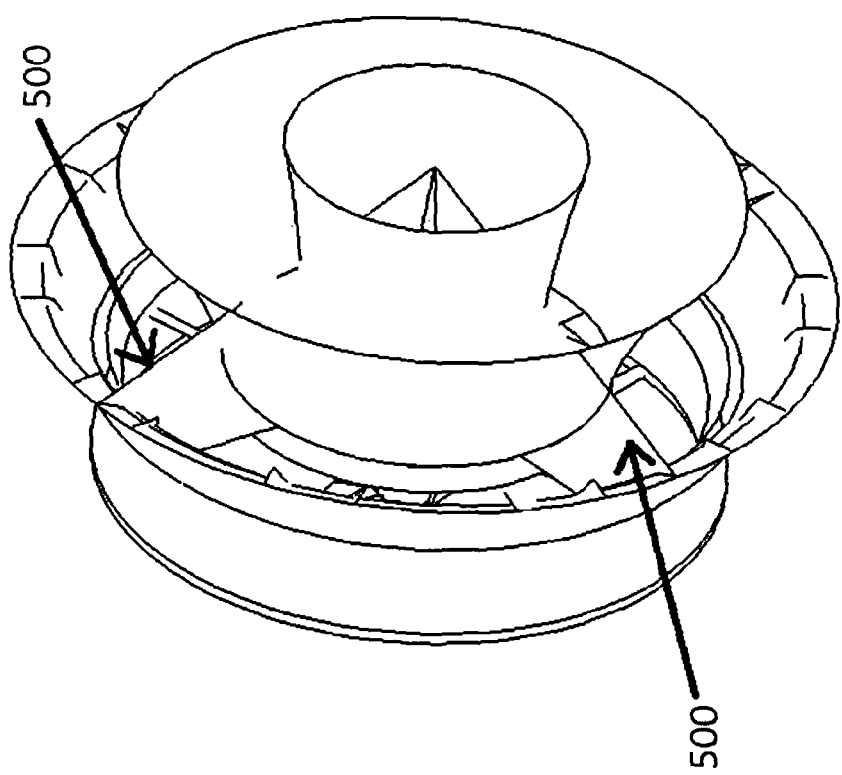
FIG. 5 is an isometric view of the rear of a diffuser e.g. the diffuser of FIG. 2.

FIG. 5 is an isometric view of the rear of the diffuser e.g. the diffuser of FIG. 2. The diffuser may comprise one or more further post-rotation guide vanes 500 which may be arranged to provide structural support to the diffuser. As noted above, for pre-rotation vanes, post rotation vanes may provide additional structural support to facilitate aero-elastic deformation of the diffuser, for example under different wind loads. In FIG. 5, the post rotation vanes 500 are located downstream of the turbine rotor plane and are arranged to reduce twist in the post-rotor airflow passing through the diffuser.

The post rotation vanes may be arranged so that a first end is connected to a first part of the diffuser and a second end is connected to a second part of the diffuser or the central shaft, the guide vanes being arranged to provide structural support to the diffuser e.g. as shown in FIG. 5.

According to another aspect of the invention a horizontal axis wind turbine diffuser may comprise a first diffuser ring arranged to form a turbine cowling, the diffuser ring having an inlet and an outlet, where the outlet area is equal to or greater than the inlet area, the diffuser comprising one or more vortex entrainment devices arranged on a trailing edge of the outlet of the diffuser ring. The one or more vortex entrainment devices may form a vortex entrainment system.

Figure 6:
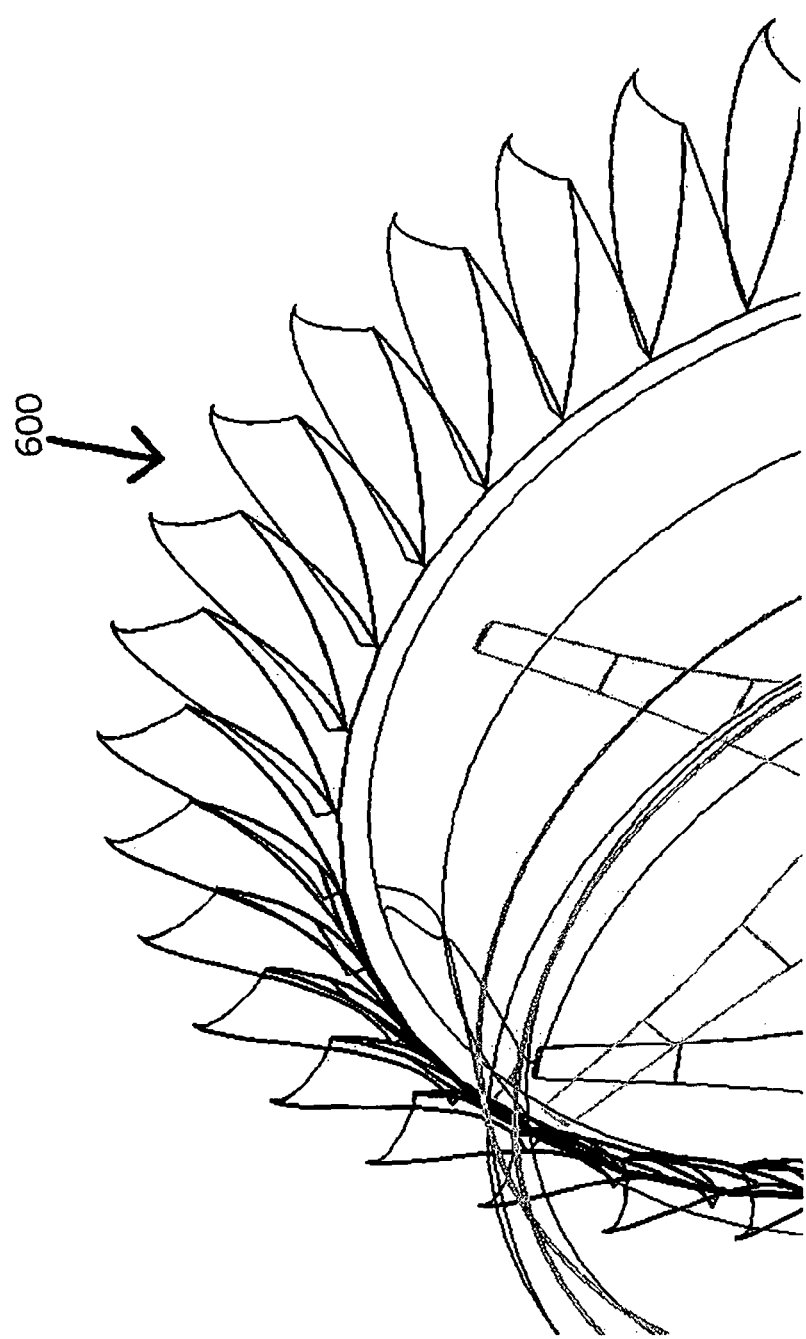
FIG. 6 is an example illustration of a vortex entrainment system.

FIG. 6 is an example illustration of a vortex entrainment system. In an embodiment the vortex entrainment system 600 may comprise one or more dynamic, aero-elastic, vortex entrainment devices. In an embodiment, the vortex entrainment system may create a plurality of micro-structure vortices which wrap around themselves and thereby induce a lower pressure downstream from the turbine rotor plane than may be found with simple geometries. The reduction in pressure behind the turbine rotor plane increases suction through the turbine blades, hence increasing efficiency. The vortex entrainment devices may be attached to the trailing edge of the first diffuser ring as shown in FIG. 6, however it will be appreciated that it may be attached to any or all of the trailing edges of the diffuser. In an example the vortex entrainment devices may be attached to the trailing edge of the outlet of the first diffuser ring and the trailing edges of the outlets of one or more further diffuser rings. The one or more vortex entrainment devices may be integrally formed with the diffuser ring. Alternatively the one or more vortex entrainment devices may be attached to the diffuser ring, using welding, bonding or other mechanical attachment means.

In an embodiment, the vortex entrainment device may additionally perform a re-energising function as described above by mixing the high energy airflow passing over the diffuser with the low energy airflow exiting the diffuser. This results in a reduction of induced drag.

For example, the tip of the vortex entrainment device may have a higher degree of sweep than the rest of the diffuser which decreases the induced drag experienced by the diffuser. Additionally or alternatively, the vortex entrainment devices may be angled upwards increasing the local dihedral near the tip in order to generate micro-structure vortices, further reducing the pressure behind the turbine plane and reduce lift-induced drag.

The vortex entrainment devices may be aero-elastic so that they deform under different wind loads in order to optimize the reduction in induced drag and vortex entrainment at various wind loads.

One or more of the guide vanes 118, 500, modified turbine rotor blades 202, slot gaps 212, vortex generators 400 or vortex entrainment system 600 may be used alone or in combination with any of the diffusers of the invention disclosed herein in order to reduce induced drag on the diffuser and improve efficiency of the wind turbine system. Additionally, the use of one or more of these features in a diffuser augmented wind turbine may help to reduce downstream wake turbulence. Wake turbulence is caused by the formation of a wake vortex behind the turbine rotor plane. Reducing the wake turbulence allows the turbines to be sited more closely together than un-augmented turbines or diffuser augmented turbines without any of these features. The ability to site the turbines closer together improves efficiency and reduces the environmental impact and cost of typical wind farm. For example, the increased efficiency may allow the same amount of power to be produced on a smaller area of land than would be required for a conventional wind turbine farm (reducing land costs and reducing visual impact on the landscape) or allowing a greater amount of power to be produced on the same amount of land (increasing power output).

The diffuser may comprise one or more vent structures located on the exterior of the diffuser. Each vent structure is connected to one or more suction slots and air is able to exit from the diffuser through the outlet of the diffuser ring and also through the vent structures. For example, a suction slot may connect to a single vent structure or to multiple vent structures. Alternatively, a single vent structure may be connected to multiple suction slots. A suction slot may have one or more partial thickness dividers or separators which provide structural support to the diffuser ring. A suction slot may have one or more partial thickness dividers or separators which provides structural support to the diffuser ring.

The vent structures may be directly connected to the suction slots, or optionally connected to the suction slots via one or more plenum chambers such as the plenum chambers described above in connection to slot gaps. In another embodiment of the invention air may be actively or passively sucked from the plenum chamber and pass through one or more of the suction slots on the exterior surface of the ring in order to assist in reducing the pressure behind the turbine plane. Vent structures may bring the exit of the diffuser into the higher energy air passing over the diffuser. This interaction with high energy airflow prevents stagnation of the air exiting the diffuser. The vent structures also increase the outlet area of the device without increasing its cross-section. Furthermore, vent structures may be used to increase structural integrity by connecting the diffuser ring to a flap structure.

In an aspect of the invention, the diffuser may comprise a primary diffuser ring and one or more vent structures and one or more suction slots. The one or more vent structures may be located on the exterior surface of the first diffuser ring and each of the vent structures may be connected to a suction slot. The diffuser may optionally comprise a number of further diffuser rings may be used (e.g. from one to four further diffuser rings such as two or three further diffuser rings (e.g. one or two further diffuser rings).

Vent structures attached to the diffuser may help to capture slightly yawed wind conditions on the exterior of the diffuser, this may produce a higher pressure exterior to the diffuser and lead to more efficient suction. In an example the vent structures stop the high-pressure air on the exterior of the diffuser from rolling over the diffuser into the low-pressure air beneath, causing induced drag. The vent structures may also aid in yaw alignment of the turbine and may negate the need for alternative passive wind yaw tracking systems. Many modern wind turbines have active yaw tracking systems and the use of vent structures may assist in active wind tracking.

The diffuser may comprise one or more vent structures and also one or more further diffuser rings that are co-axial to and downstream from the first diffuser ring, the one or more further diffuser rings also having an inlet and an outlet. The inlet area of the diffuser ring is less than the outlet area of the immediately upstream diffuser ring and the outlet area is greater than or equal to the inlet area of that diffuser ring (e.g. the outlet area of each diffuser ring is greater than its inlet area).

The vent structures may be used in combination with an active pumping system in order to increase the extraction of air from the diffuser. In another embodiment the vent structures may be used to provide air to a high energy blowing slot gap, as opposed to the passive, or actively pumped slot gaps described above.

Figure 7:
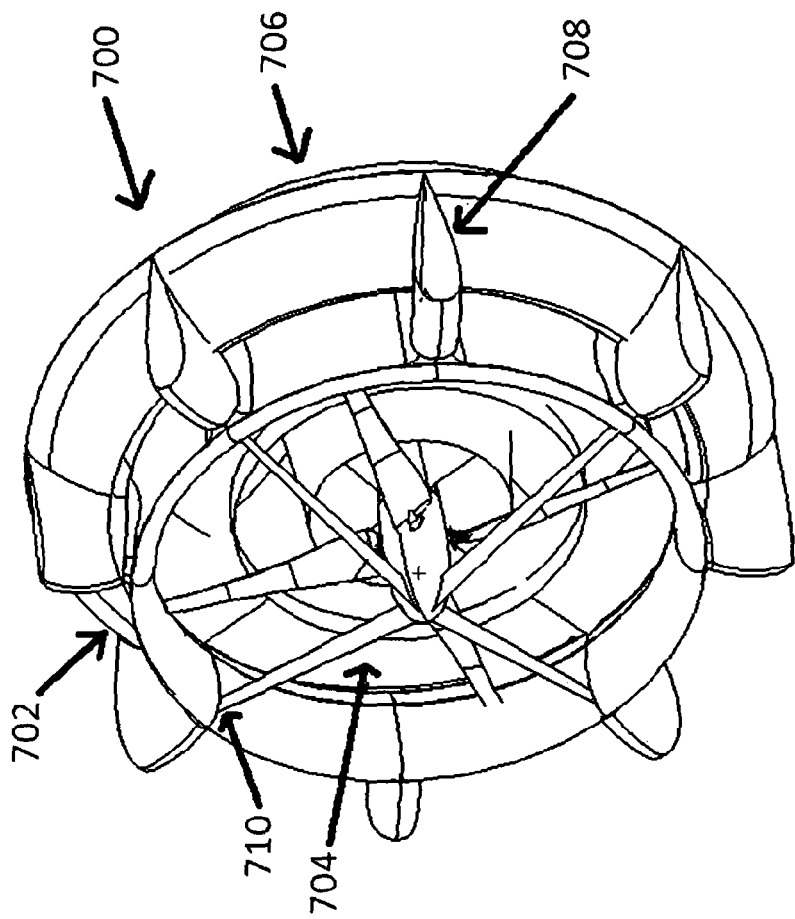
FIG. 7 is an isometric view of the front of a diffuser embodiment with a plurality of vents.

FIG. 7 is an isometric view of the front of a diffuser embodiment with a plurality of vents 708. As shown in FIG. 7, a wind turbine may be augmented with a diffuser 700, none of the diffuser elements being rotatable about the horizontal axis, that comprises a first (primary) diffuser ring 702 which has an inlet 704 and an outlet 706, the outlet area being equal to or greater than the inlet area (e.g. the outlet area is preferably greater than the inlet area).

The diffuser of FIG. 7 additionally features one or more vent structures 708 and one or more suction slots 710. The one or more vent structures may be located on the exterior surface of one or more of the diffuser rings e.g. the first diffuser ring, and the vent structures 708 are connected to one or more suction slots 710. The suction slot may extend substantially radially through the entire thickness of the first diffuser ring.

In an embodiment the vent structures reduce the pressure in a cavity or plenum chamber in the diffuser ring 702. Air is therefore bled from a suction slot 710 situated behind the rotor plane. The outlet of the diffuser is therefore formed by the outlet of the diffuser ring and the outlets of each vent structure. In an embodiment the total outlet area of the diffuser is greater than its largest cross-sectional area. In some embodiments some of the vent structure outlet and therefore some of the diffuser outlet is located in front of the rotor plane, as shown in by the positioning of the vent structures 708 in FIG. 7. The vent structures and the suction slots may be located on a primary flap of the first diffuser ring (not shown in FIG. 7).

In another embodiment of the invention the vent structure 708 may be connected to a slot gap (not shown) e.g. via a plenum chamber (such as the plenum chamber described above) and air may be drawn into the vent structure in order to facilitate re-energisation of the low energy airflow within the diffuser by allowing high energy airflow from the outside of the diffuser to enter the diffuser through the diffuser wall, as described above.

Figure 8:
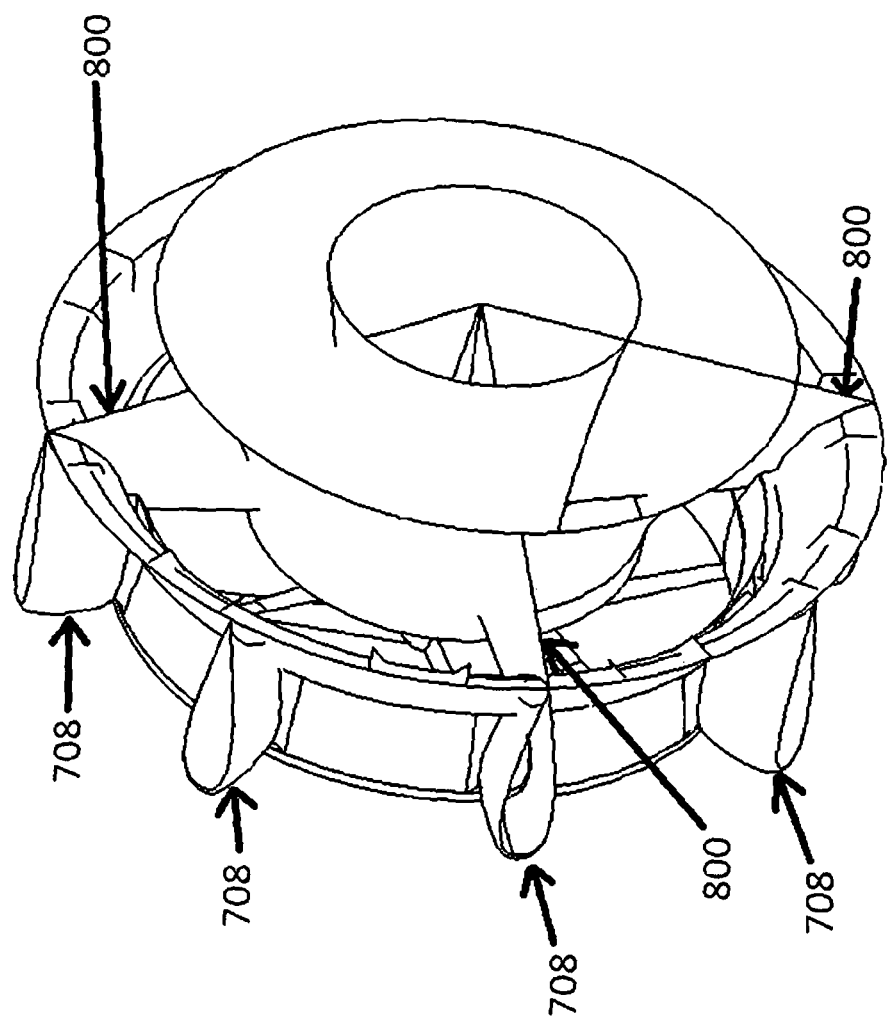
FIG. 8 is an isometric view of the rear of a diffuser embodiment with a plurality of vents as shown in FIG. 7.

FIG. 8 is an isometric view of the rear of the diffuser embodiment with a plurality of vents 708 as shown in FIG. 7. The vent structures 708 may also be extended to connect to the guide vanes, for example the post rotation guide vanes 800 as shown in FIG. 8. Connecting the vent structures to the post rotation guide vanes 800 may assist in load control and help to maintain the structural integrity of the diffuser.

Figure 9:
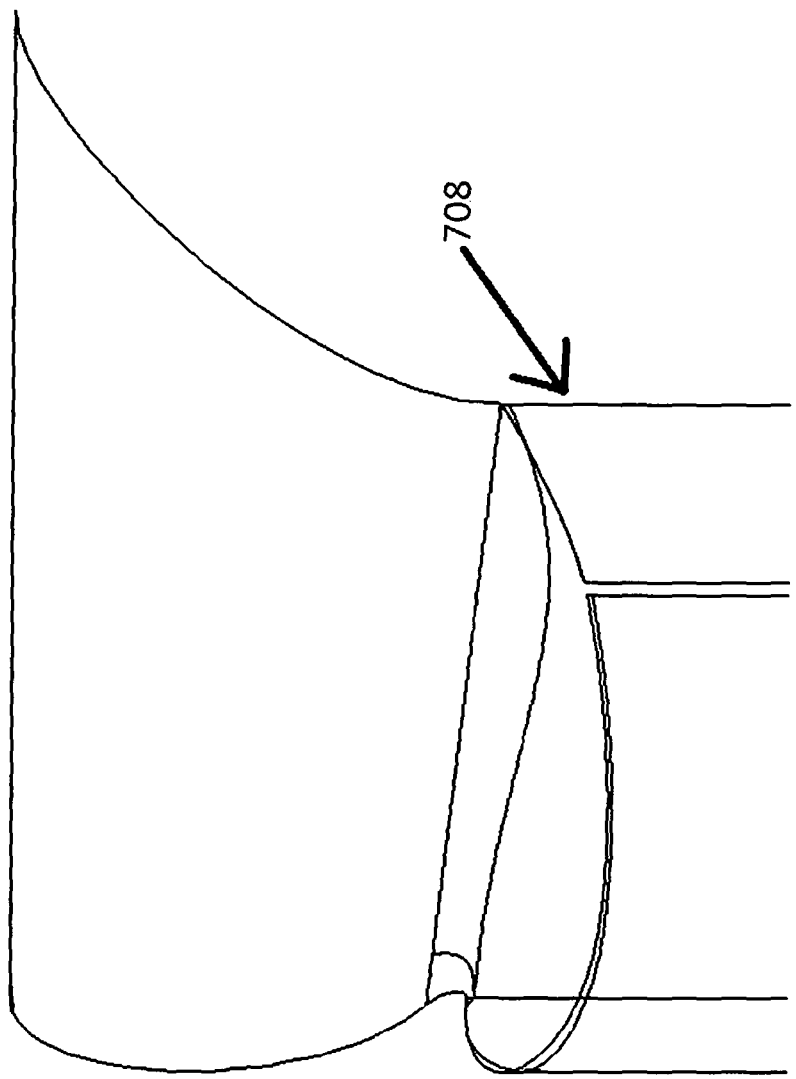
FIG. 9 is an example illustration of a vent structure.

FIG. 9 is an example illustration of vent structures. The vent structures 708 may be hollow channel structures shaped to form an aerofoil in cross-section, without wishing to be bound by theory, it is thought that this confirmation may reduce airflow energy losses downstream of the vent structures. For example, the vent structures 708 may be connected to a plenum chamber (not shown) in a passive or active system. An active system may pump air into the diffuser or suck air out of the diffuser as described in reference to the suction slots and slot gaps above.

The turbine rotor of any of the diffuser augmented wind turbines described herein may be located at the rear of the central shaft nacelle and downstream of the principle vertical axis of the turbine, wherein the principle vertical axis is the axis about which the turbine yaws. In an example, the rotor may be located on the downstream (lee) side of a support tower when the turbine is in use. In an example a turbine rotor downstream of the vertical yaw axis of the turbine may enable the turbine rotor to act as part of a passive yaw system as described above. In an example, the turbine may freely point into the wind without the aid of a mechanical pointing system.

A diffuser augmented wind turbine may include one or more additional rotors co-axial to and downstream from the first rotor such as up to 10 rotors (e.g. 5 rotors, such as 3 rotors, or particularly, 2 rotors). The one or more turbines may be co-rotating blades with their combined co-rotation optionally turning the same generator or separate generators (e.g. the same generator). Energy may be recovered from wake hitting the next rotor (e.g. hitting the bottom of the next rotor, such as at the tips of the rotor blades). A system which expels or accelerates mass in one direction will cause a proportional but opposite force on that system. A single rotor wind turbine may create a significant amount of tangential or rotational air flow. The energy of this tangential air flow may be wasted where there is only a single turbine. A second turbine placed downstream of the first may take advantage of this airflow.

In a further embodiment, the turbine rotors may be counter-rotating rotors, which may power the same generator or different generators (e.g. the same generator). Two or more counter rotating turbines may eliminate the need for complex gearing and yawing mechanisms. Counter-rotating turbines may be used to increase the rotation speed of the electrical generator. In an example the one or more turbine rotor blades in each turbine rotor may be slightly angled forwards so as to avoid hitting the rear ones. In another example the one or more turbines or more turbines may be of different diameters.

The total outlet or exit area of the diffuser is comprised of the number of outlets downstream of the primary rotor plane. The downstream outlet area may optionally include one or more vent structures and one or more suction slots as described above. The diffuser may also optionally include one or more further diffuser rings that are co-axial to and downstream from the first diffuser ring, the one or more further diffuser rings also having an inlet and an outlet. The downstream diffuser rings may also be downstream of the plane of the second turbine rotor. The inlet area of each of the one or more further diffuser rings is less than the outlet area of the immediately upstream diffuser ring and the outlet area of each diffuser ring may be greater than or equal to its inlet area, as described above.

As described herein, air is able to escape from the diffuser through the portion of each diffuser ring that is un-occluded by the immediately downstream diffuser ring. The exit of the diffuser may therefore also include a portion of each of the diffuser rings that is un-occluded by the inlet area of the downstream diffuser ring. The total outlet area of the diffuser downstream of the first rotor plane is therefore greater than its largest vertical cross-sectional area.

Figure 10:
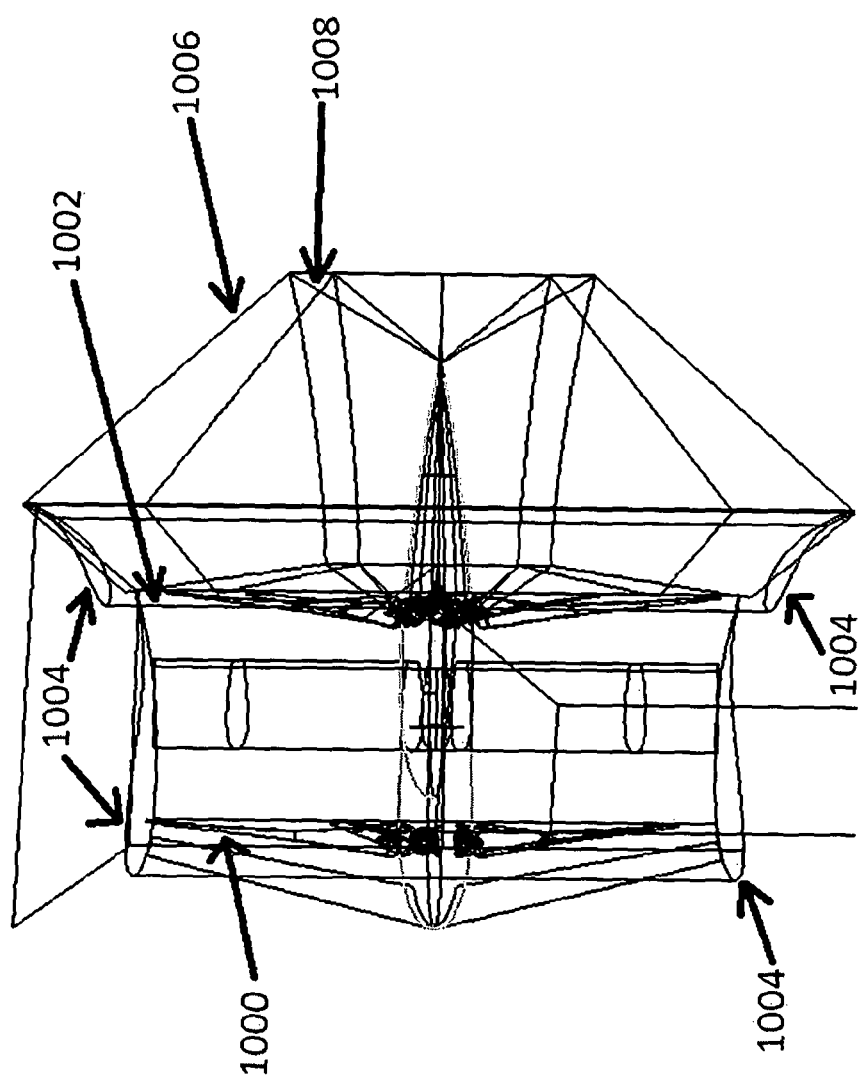
FIG. 10 is a side view of a diffuser augmented wind turbine with co-axial rotors.

FIG. 10 is a side view of a diffuser augmented wind turbine with co-axial rotors where a first turbine rotor 1000, comprising one or more turbine blades, and a second turbine rotor 1002, comprising one or more turbine blades, may be connected to the same central driveshaft (not shown). As shown in FIG. 10, a number of suction slots 1004 and one or more further diffuser rings 1006, 1008 may be located downstream of the first rotor plane.

A diffuser augmented wind-turbine as described above may comprise one or more generators, the one or more generators comprising at least one generator stator and at least one generator rotor, one of the stator or rotor being fixed to or incorporated within the first diffuser ring and the other of the generator stator or generator rotor being fixed to or incorporated within the tip of the at least one turbine rotor blade. A generator incorporated into the diffuser and turbine rotor blades may augment or replace a generator in the central support shaft.

As will be appreciated, the diffuser configurations as described herein, may incorporate any or all of the other features described above with reference to FIGS. 1-10, whether alone or in combination.

Any range or device value given herein may be extended or altered without losing the effect sought as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought. The method blocks or elements identified do not comprise an exclusive list and a method or apparatus may contain additional blocks or elements.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

It will be understood that the benefits and advantages described above may relate to one embodiment or may relate to several embodiments. The embodiments are not limited to those that solve any or all of the stated problems or those that have any or all of the stated benefits and advantages.

The invention claimed is:

1. A horizontal axis wind turbine augmented with a diffuser comprising;
   a first diffuser ring arranged to form a turbine rotor cowling, the first diffuser ring having an inlet and an outlet, where the outlet area is equal to or greater than the inlet area; and
   one or more further diffuser rings co-axial to and downstream from the first diffuser ring, the one or more further diffuser rings each having an inlet and an outlet where the inlet area of each of the one or more further diffuser rings is less than the outlet area of an immediately upstream diffuser ring and the outlet area of each of the one or more further diffuser rings is greater than or equal to the inlet area;
   wherein a total outlet area of the diffuser is greater than a largest cross-sectional area of the diffuser, provided that the first diffuser ring and all of the one or more further diffuser rings are not rotatable around the horizontal axis; and
   wherein the diffuser is at least partially constructed from an aero-elastic material and arranged to provide a controlled deformation under wind load.

2. A wind turbine according to claim 1 wherein the diffuser further comprises one or more vent structures and one or more suction slots, where the one or more vent structures are located on the exterior surface of the first diffuser ring and the or each vent structure is connected to one or more suction slots, the suction slots extending substantially radially through the entire thickness of the first diffuser ring.

3. A wind turbine according to claim 1, wherein the ratio of the total diffuser outlet area to the first diffuser ring inlet area is greater than the ratio of the largest diffuser cross-sectional area to the first diffuser ring inlet area.

4. A wind turbine according to claim 2, wherein the vent structures are hollow channel structures shaped to have an aerofoil profile in cross-section.

5. A wind turbine according to claim 1 further comprising a central shaft.

6. A wind turbine according to claim 1 further comprising a plurality of radially oriented guide vanes arranged so that a first end is connected to a first part of the diffuser and a second end is connected to a second part of the diffuser or the central shaft, the guide vanes being arranged to provide structural support to the diffuser.

7. A wind turbine according to claim 4, wherein the guide vanes are arranged to reduce twist in airflow passing through the diffuser and are comprised of at least one of pre-rotation vanes, located upstream of the turbine plane and/or post-rotation vanes, located downstream of the turbine plane.

8. A wind turbine according to claim 1 comprising one or more turbine blades to form a first turbine rotor.

9. A wind turbine according to claim 8 wherein the one or more turbine blades forming the first turbine rotor are at least partially constructed from an aero-elastic material and arranged to provide a controlled deformation under wind load.

10. A wind turbine according to claim 1 wherein the diffuser incorporates a vortex generator.

11. A wind turbine according to claim 1 where, in a downstream direction, each of the one or more further diffuser rings has a lower camber than the immediately previous diffuser ring.

12. A wind turbine according to claim 1 wherein the diffuser further comprises one or more slot gaps which extend from the interior surface through at least a partial thickness of the first diffuser ring.

13. A wind turbine according to claim 12 wherein the one or more slot gaps and/or the one or more suction slots is located on a region of the interior of the first diffuser ring which is highly cambered.

14. A wind turbine according to claim 12 wherein the one more slot gaps extend through the entire thickness of the first diffuser ring.

15. A wind turbine according to claim 12 wherein the first diffuser ring incorporates a plenum chamber that is connected to one or more of the slot gaps and/or one or more or the suction slots.

16. A wind turbine according to claim 15 wherein air is actively pumped into or sucked out of the plenum chamber.

17. A wind turbine according to claim 8 wherein the turbine rotor blades are constructed of material which induces turbulence in the boundary layer of the airflow.

18. A wind turbine according to claim 8 wherein the one or more turbine rotor blades have at least one attached turbulator and/or at least one attached vortex generators.

19. A wind turbine according to claim 8 wherein the one or more turbine rotor blades has a partially scalloped structure.

20. A wind turbine according to claim 8 wherein the first turbine rotor is located downstream of the principle vertical axis of the turbine.

21. A wind turbine according to claim 8 further comprising one or more additional turbine rotors each comprising one or more turbine rotor blades mounted co-axial to and downstream of the first turbine rotor.

22. A wind turbine according to claim 17 where the one or more additional turbine rotors is a counter-rotating turbine rotor.

23. A wind turbine according to claim 17 where the one or more turbine blades of the one or more additional turbine rotors is at least partially constructed from an aero-elastic material and arranged to provide a controlled deformation under wind load.

24. A wind turbine according to claim 1 including a generator, the generator comprising a generator stator and a generator rotor, one of the generator stator or generator rotor being fixed to or incorporated within one or more diffuser rings and the other of the generator stator or generator rotor being fixed to or incorporated within the tip of at least one turbine blade.

25. A wind turbine according to claim 1 which is any of: a land based turbine, a sea based turbine or an airborne turbine.

26. A horizontal axis wind turbine augmented with a diffuser comprising:
   a first diffuser ring arranged to form a turbine rotor cowling, the diffuser ring having an inlet and an outlet, where the outlet area is equal to or greater than the inlet area;
   one or more vent structures and one or more suction slots, where the one or more vent structures are located on the exterior surface of the first diffuser ring and the one or more vent structures are each connected to one or more suction slots, the suction slots extending substantially radially through the entire thickness of the first diffuser ring; and wherein the total outlet area of the diffuser is greater than its largest cross-sectional area, provided that the first diffuser ring is not rotatable around the horizontal axis.

27. A wind turbine as claimed in claim 26 wherein the diffuser further comprises one or more further diffuser rings co-axial to and downstream from the first diffuser ring, the one or more further diffuser rings each having an inlet and an outlet where the inlet area of each of the one or more further diffuser rings is less than the outlet area of the immediately upstream diffuser ring and the outlet area of each of the one or more diffuser rings is greater than or equal to its inlet area, provided that the all of the one or more further diffuser rings are not rotatable around the horizontal axis.

28. A horizontal axis wind turbine augmented with a diffuser comprising:

a first diffuser ring arranged to form a turbine rotor cowling, the first diffuser ring having an inlet and an outlet, where the outlet area is equal to or greater than the inlet area, provided that the first diffuser ring is not rotatable around the horizontal axis;

one or more vortex entrainment devices arranged on a trailing edge of the outlet of the first diffuser ring; and one or more further dynamic, aero-elastic, vortex entrainment devices attached to a further trailing edge of the diffuser.

29. A wind turbine according to claim 28 wherein the diffuser further comprises one or more vent structures and one or more suction slots, where the one or more vent structures are located on the exterior surface of the first diffuser ring and the or each vent structure is connected to one or more suction slots, the suction slots extending substantially radially through the entire thickness of the first diffuser ring.

* * * * *